Z. NICKERSON.
BAILS FOR CAST METAL HOLLOW-WARE.

No. 186,947.  Patented Feb. 6, 1877.

Witnesses.  Inventor:
Louis A. Curtis  Ziba Nickerson.
H. E. Boardman.  H. Curtis. Atty.

UNITED STATES PATENT OFFICE.

ZIBA NICKERSON, OF SOUTH CARVER, MASSACHUSETTS.

IMPROVEMENT IN BAILS FOR CAST-METAL HOLLOW WARE.

Specification forming part of Letters Patent No. 186,947, dated February 6, 1877; application filed September 30, 1876.

*To all whom it may concern:*

Be it known that I, ZIBA NICKERSON, of South Carver, Plymouth county, Massachusetts, have invented a new and useful Method of Attaching Bails to Cast-Metal Hollow Ware, of which the following is a specification:

This invention consists in creating a cell or pocket in opposite sides of the outer surface of the upper edge of the vessel, and inserting each end of the bail in one of these sockets, the mouth of the pocket being closed and the bail end prevented from escaping by a washer applied and adapted as hereinafter explained.

Figure 1:
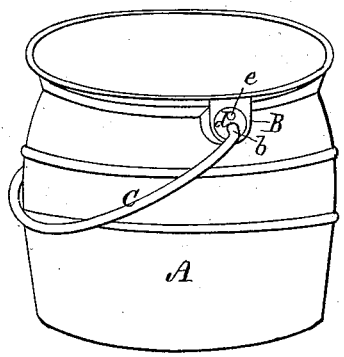
Figure 2:
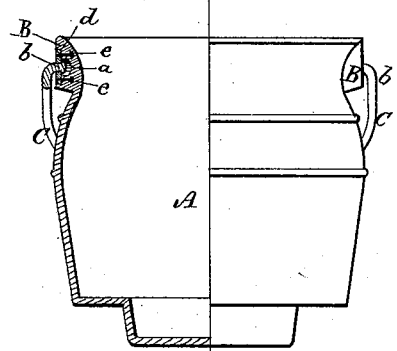
Figure 3:
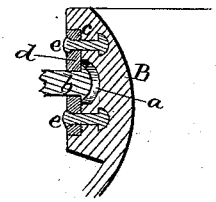

The drawings accompanying this specification represent, in Figure 1, a perspective view, and Fig. 2 a vertical section, of my improvement. Fig. 3 is a section, on an enlarged scale, of a mode of connecting the bail to a vessel.

In these drawings, A represents a cast-iron pot, such as is in common use upon stoves for culinary purposes.

In carrying out my improvement, I cast upon opposite outer sides of the upper edge of the pot A an enlargement or boss, B, in which I create a pocket, $a$, of a size and depth to readily receive the end $b$ of the pot-bail, which latter is shown at C, and I countersink or rabbet the mouth of this pocket, as shown at $c$, to receive a washer, as hereinafter explained. I next pass a washer, $d$, about each end of the bail C, and head down such ends, in order that the washer cannot escape or the two become detached. I next insert the washer $d$ in the rabbet $c$, and rivet it to the boss B in any suitable manner, and the application of the bail to the vessel is completed.

The method I prefer for riveting the washer to the boss is that shown in the accompanying drawings, in which the rivets $e\ e$, &c., are cast in the metal of the pot and project into the rabbet $c$, which is filled by the washer. Holes are bored in the washer, to inclose the ends of the rivets, and the latter are headed down upon the outside of such washers, thus securely confining the latter and the bail to the pot.

Among the advantages of my improvement are the following: The bail swings freely at all times, and is stronger than at present made; the parts do not readily collect dust, and the vessel is therefore easily cleaned and kept clean; the form of the bail which my construction permits affords ample room for the cover of the vessel; and, finally, considerable enconomy in space is effected in transportation, and less liability of breakage.

I claim as my invention and desire to secure by Letters Patent of the United States—

The means herein described for attaching bails to hollow ware, consisting of the pocket $a$ and washer $d$, in combination with the headed or enlarged end of the bail, the pocket serving to receive such enlargement, and the washer serving to prevent pulling out of such bail, and being riveted to the body of the vessel, as explained, the whole being arranged substantially as set forth.

ZIBA NICKERSON.

Witnesses:
F. CURTIS,
W. E. BOARDMAN.